United States Patent [19]

Oyabu et al.

[11] Patent Number: 4,837,846

[45] Date of Patent: Jun. 6, 1989

[54] METHOD OF THE IMAGE PROCESSING

[75] Inventors: Masaaki Oyabu, Aichi; Masamichi Sugiura, Toyokawa; Hirofumi Hasegawa, Toyokawa; Munehiro Nakatani, Toyokawa, all of Japan

[73] Assignee: Minolta Camera Kabushiki Kaisha, Osaka, Japan

[21] Appl. No.: 777,214

[22] Filed: Sep. 18, 1985

[30] Foreign Application Priority Data

Sep. 19, 1984 [JP] Japan .................................. 59-197448

[51] Int. Cl.⁴ .............................................. G06K 9/00
[52] U.S. Cl. ........................................ 382/50; 358/283
[58] Field of Search ....................... 382/50, 51, 52, 53; 358/280, 282, 283

[56] References Cited

U.S. PATENT DOCUMENTS

| | | | |
|---|---|---|---|
| 3,665,326 | 5/1972 | Sullivan | 382/51 |
| 4,439,789 | 3/1984 | Cahill | 358/282 |
| 4,495,522 | 1/1985 | Matsunawa et al. | 358/283 |
| 4,578,713 | 3/1986 | Tsao et al. | 382/50 |

Primary Examiner—Leo H. Boudreau
Attorney, Agent, or Firm—Price, Gess & Ubell

[57] ABSTRACT

A method of image processing for sampling the concentration of each portion of an image in the unit of a picture element and for binarizing the concentrations of picture elements in the unit of a submatrix of predetermined size to obtain a bi-level image, being characterized in that the bi-level image is obtained from the concentrations having been sampled according to the steps as follows: (a) calculating the average of the concentrations of the picture elements at every submatrix to which the picture elements belong; (b) determining the number of elements in the submatrix to be treated as either one of black and white according to a predetermined relation with the average; (c) assigning elements in the submatrix as the elements to be treated as either one of black and white up to the number determined in the step (b) in the predetermined order of the concentration of each element.

2 Claims, 4 Drawing Sheets

| 0 | 8 | 2 | 10 |
|---|---|---|----|
| 12 | 4 | 14 | 6 |
| 3 | 11 | 1 | 9 |
| 15 | 7 | 13 | 5 |

| 1 | 2 | 3 | 4 |
|---|---|---|---|
| 5 | 6 | 7 | 8 |
| 9 | 10 | 11 | 12 |
| 13 | 14 | 15 | 16 |

Fig. 2
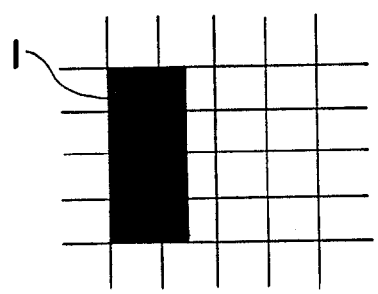
Fig. 5
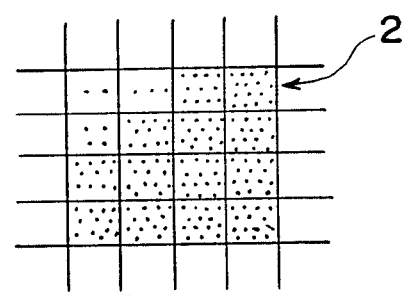
Fig. 3
| 12 | 6 | 0 | 0 |
|----|---|---|---|
| 12 | 6 | 0 | 0 |
| 12 | 6 | 0 | 0 |
| 12 | 6 | 0 | 0 |
Fig. 6
| 2  | 3  | 11 | 14 |
|----|----|----|----|
| 4  | 11 | 13 | 14 |
| 11 | 13 | 14 | 14 |
| 12 | 13 | 14 | 14 |
Fig. 4
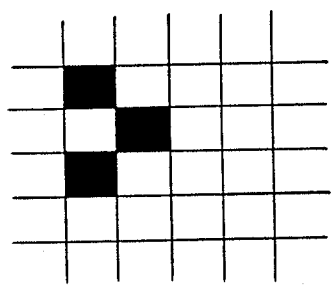
Fig. 7
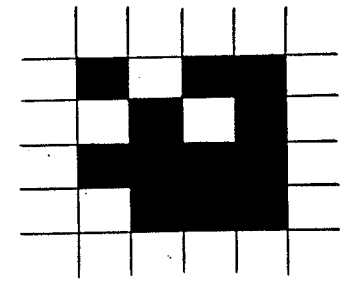
Fig. 12
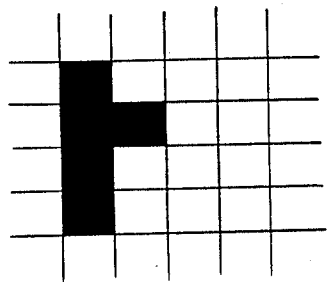
Fig. 13
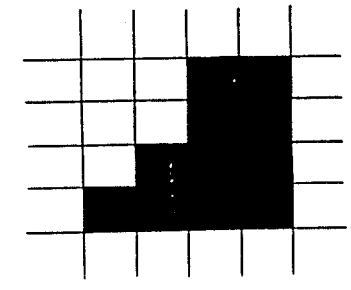

METHOD OF THE IMAGE PROCESSING

BACKGROUND OF THE INVENTION

1. Field of the Invention

The present invention relates to a method apparatus of image processing wherein an image, such as a copier image, including at least one half-tone portion is reproduced by bi-level quantization.

2. Description of the Prior Art

When an image is reproduced with bi-level quantization of black and white, a half-tone image will also be reproduced as a bi-level image. The resolution and the tone (or the reproduction of concentration) are important factors in the image processing. The resolution is important especially for line images such as a character, a symbol and the like, whereas the tone is important for half-tone images such as a picture of a face. Because the resolution and the tone counteract to each other, various kinds of image processing methods in apparatus have been developed in order to make both factors compatible. The compatibility is especially needed for an image wherein both a line image and a tone image are mixed.

The systematic dither processing is effective for reproduction of a half-tone image. In this processing, the concentration signals of an image sampled by a scan of picture elements of $N \times M$ matrix are divided into $P \times P$ submatrices, and the concentration signals of each submatrix are binarized with predetermined threshold values of $P \times P$ matrix of a dither pattern (see, for example, FIG. 1).

An example of image processing of the systematic dither processing will be explained below: First, assume that such a line image 1 as shown in FIG. 2 is detected by sixteen picture elements which constitute a $4 \times 4$ submatrix. Each of the numerical values given to each of the elements of a submatrix shown in FIG. 3 represents the concentration of the line image at each corresponding picture elements of the submatrix shown in FIG. 2. When a matrix of the Bayer type shown in FIG. 1 is employed as a dither pattern, the numerical value of each element shown in FIG. 3 is compared with that of the counter element of the Bayer type dither matrix which gives a threshold level of each picture element. The element in the submatrix where the concentration is larger than the threshold is binarized as black. FIG. 4 shows a bi-level image thus reproduced.

In a second example, such a half-tone image 2 as shown in FIG. 5 schematically is processed similarly. Each of the numerical values given to each of the elements of a submatrix shown in FIG. 6 represents the concentration of the corresponding picture element of the submatrix shown in FIG. 5. According to the image processing by using a dither matrix of the Bayer type shown in FIG. 1, the half-tone image 2 of FIG. 5 is reproduced as a bi-level image as is shown in FIG. 7.

As mentioned above, in the systematic dither processing, the concentration signal of each picture element in a matrix of $N(/mm) \times M(/mm)$ picture elements are processed in the unit of $P \times P$ submatrix. If P increases, $N/P$ and $M/P$ decreases, and the resolution becomes lower. On the contrary, if P decreases or if the submatrix becomes small, the tone is deteriorated. Thus, it is difficult to reproduce a half-tone image having a satisfactory quality in respect to both resolution and tone.

For example, an image including a half-tone portion is sampled with picture elements of $8(/mm) \times 8(/mm)$ matrix, and the image is reproduced with black and white picture elements of $8(/mm) \times 8(/mm)$ matrix as a result of the dither processing. If a dither pattern of $2 \times 2$ matrix is used, the size of each picture element of the image to be reproduced does not become large so that the resolution is not significantly lowered largely while the image cannot be reproduced to provide a tone of high quality. On the contrary, if a dither pattern of $4 \times 4$ matrix is used, although the tone is improved, the resolution o the image is lowered so that the quality of the reproduced image becomes worse.

In the JPN. Pat. laid open publication No. 138969/1980, a process is disclosed wherein the concentration level of a picture element under consideration is estimated by taking those of the element pictures surrounding the picture element into account in order to determine the bi-level of each surrounding picture elements. This processing method corresponds substantially to a dither processing with a finer dither pattern. Accordingly, it can not essentially improve the resolution of a line image.

SUMMARY OF THE INVENTION

A purpose of the present invention is to provide a method of image processing wherein a line image can be reproduced without lowering the resolution thereof while an image, including at least one portion of half-tone image can be reproduced with a high resolution and in an excellent tone.

According to the present invention, there is provided a method of image processing for sampling the concentration of each portion of an image in the unit of a picture element and for binarizing the concentrations of picture elements in the unit of a submatrix of a predetermined size to obtain a bi-level image, being characterized in that the bi-level image obtained from the concentrations have been sampled according to the steps as follows:

(a) calculating the average of the concentrations of the picture elements at every submatrix to which the picture elements belong;

(b) determining the number of elements in the submatrix to be treated as black or white according to predetermined relationship with the average;

(c) assigning elements in the submatrix up to the number of elements determined in the step (b) in decreasing or increasing order of concentration according as whether black or white dots are to be printed.

An advantage of the present invention is that an image which includes at least one half-tone portion can be reproduced by bi-level quantization with a high fidelity to the original image without lowering the resolution.

BRIEF EXPLANATION OF THE DRAWINGS

Further objects and advantages of the present invention will be apparent from the following description, reference being had to the accompanying drawings wherein preferred embodiments of the present invention are clearly shown.

In the drawings:

FIG. 2 is a line image;

FIG. 3 is a submatrix of the concentration of the line image shown in FIG. 2;

FIG. 4 is a reproduction of the line image shown in FIG. 2 by a dither process;

FIG. 5 is a half-tone image;

FIG. 6 is a submatrix of the concentration of the half-tone image shown in FIG. 5;

FIG. 7 is a reproduction of the half-tone image shown in FIG. 2 by a dither process;

FIG. 12 is a reproduction of a line image according to an embodiment of the present invention; and FIG. 13 is a reproduction of a half-tone image according to an embodiment of the present invention.

DESCRIPTION OF PREFERRED EMBODIMENTS OF THE INVENTION

Figure 8:
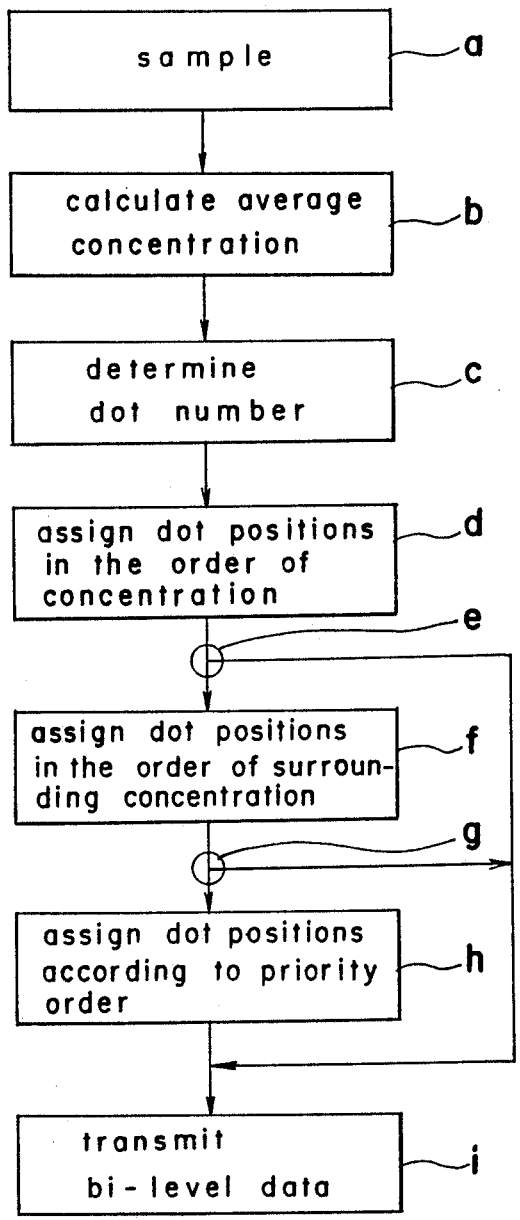
FIG. 8 is a chart which shows processes according to the present invention.

Referring to FIG. 8, in a method of image processing according to the present invention, (a) the concentrations are sampled in the unit of one element at the a step and are binarized in the unit of a submatrix of a predetermined size. In the binarizing process, (b) an average concentration in every submatrix is calculated, (c) the dot number in the submatrix, that is, the number of elements to be assigned as black or white is determined from the average concentration, and (d) elements (dot positions) in the submatrix are assigned up to the dot number in the order of concentration.

All elements up to the determined dot number may not be assigned only by the above-mentioned process. (e) Such a case, wherein the number of the rest of the elements that still remain to be assigned is smaller than the number of elements having the same concentration, may arise when the concentration level approaches the average concentration. (f) Then, the elements that still remained to be assigned are assigned successively in the order of the surrounding concentration which is calculated as a sum or an average of concentrations of the elements surrounding each element having the same concentration. This means substantially that elements which are locate near the elements designated already are assigned priority.

(g) If all elements up to the dot number are not assigned by the above-mentioned processes, that is, if the number of elements that still remained to be assigned next are smaller than the number of the elements having the same surrounding concentration, (h) the elements the still remain to be assigned are assigned in the order of a predetermined table which defines the order of the assignment in a submatrix.

Then, (i) the bi-level data obtained by the above-mentioned processes are transmitted to external equipment such as a printer.

Figures 1, 9, 11:
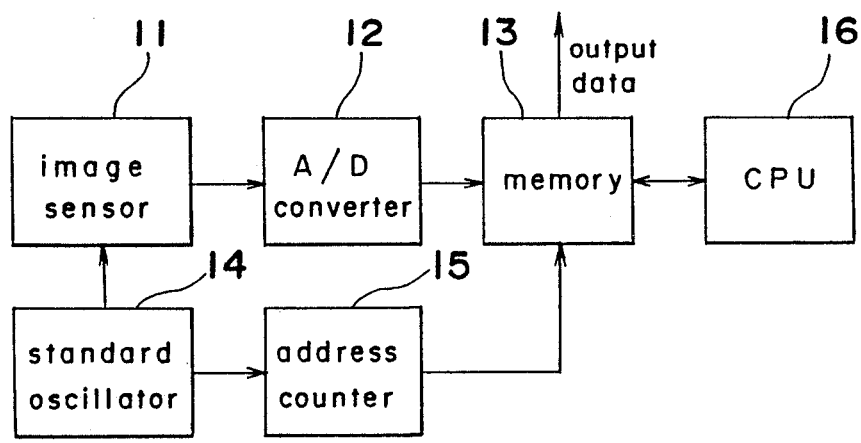
FIG. 1 is a dither matrix of the Bayer type.
FIG. 9 is a block diagram of an image processing apparatus according to the present invention.
FIG. 11 is a diagram which shows the of picture elements with numbers.

FIG. 9 shows a block diagram of an image processing apparatus of the mirror-scan type or of the document-scan type wherein an embodiment of the present invention is adopted. A concentration signal sampled by an image sensor 11 is quantized by an A/D converter 12, and is stored in a memory 13. A standard oscillator 14 gives a clock signal to the image sensor 11 and to an address counter 15 which in turn gives an address to the memory 13. Thus, the memory 13 is synchronized with the image sensor 11 on sampling. The memory 13 is connected to a CPU 16. The concentration signals once stored in the memory 13 are transformed to bi-level signals, which in turn are transmitted to external equipment such as a printer.

Figure 10:
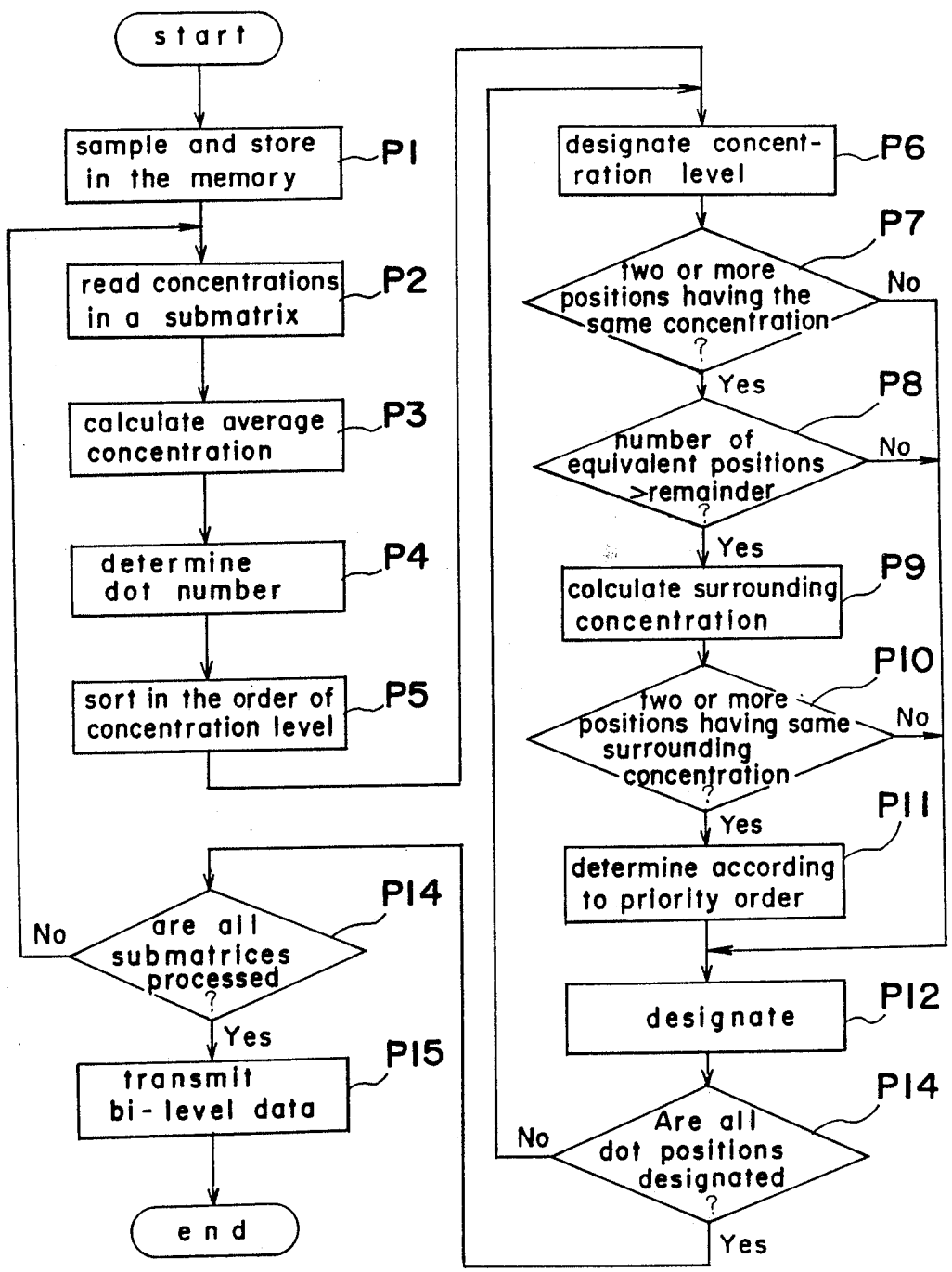
FIG. 10 is a flow chart of a program to be used in the present invention.

FIG. 10 shows a flow chart of a program stored in the CPU 16 according to embodiments of the present invention.

As a first example, the reproduction of a line image 1 shown in FIG. 2 will be explained. FIG. 10 deals with a process of determining the picture elements for black dots. On the other hand, a case of determining white dots can be processed similarly by taking into account a reverse relation to the concentration.

First, the concentration level signals sampled by the image sensor 11 are stored in the memory 13 (step P1).

After the entire image 1 has been sampled, the concentration level signals are processed in the unit of a 4×4 submatrix for bi-level quantization as follows: A concentration pattern in the unit of a 4×4 submatrix shown in FIG. 3, corresponding to the line image 1 shown in FIG. 2, is read out of the memory 13 (step P2). An average concentration of the concentration pattern is calculated (step P3), and the average concentration is found to be $(12 \times 4 + 6 \times 4)/16 = 4.5$. Next, the dot number, that is, the number of elements to be printed as black or white is determined from the average concentration (step P4). For example, the dot number is five if it is determined as an integer obtained by rounding off fractions of the average x. (In general, the dot number can be determined by using an appropriate function $f(x)$ of the average x. In this case we use $f(x)=x$ concisely.) In case of a white-dot output where the positions of picture elements for white dots are designated, we use $f(x)=P \times P - x$ where P is the size of the submatrix.)

Next, the concentration level data are arranged in the order of the concentration by sorting them (step P5). Here, we indicate the positions of the picture elements in a submatrix respectively by the numbers shown in FIG. 11, and express the concentration level data with the combination of the picture element position and the concentration level thereat. Then, the concentration level data shown in FIG. 3 are rearranged in the decreasing order of concentration, that is, "1"-12, "5"-12, "9"-12, "13"-12, "2"-6, "6"-6, "10"-6, "14"-6, "3"-0, "4"-0, "7"-0, "8"-0, "11"-0, "12"-0, "15"-0 and "16"-0. In case of white-dot output the order should be reversed.

Next, black dots of the dot number obtained in step P4 are assigned in the decreasing order of concentration level. First, the highest concentration of the picture elements which have not yet been assigned is designated as the concentration level for assignment (step P6). Now, the highest level 12 is designated. (In case of white-dot output, the lowest concentration level is designated.) Next, a check is made to determine whether the number of the picture elements having the same concentration level designated is larger than one (step P7). Four equivalent positions ("1", "5", "9" and "13") is found to exist at the concentration level 12. (If the result of the check is "No", the process is skipped to step P12 immediately and the position for black dot is designated.) Next, it is also decided whether the number of the remainder (in the present case, five) still remained to be assigned among the picture elements of the dot number is smaller than that of the elements having the same concentration level (at present, four) (step P8). Since the decision is "No" in the present example, steps P9–P11 are skipped to step P12, and four equivalent positions ("1", "5", "9" and "13") for black dots are designated in step P12. Then, it is decided whether the designation of the dot positions is completed (step P13). Because the decision is "No" in the present case, the process is returned to step P6, and the next concentration level "6" is designated therein. It is found that four equivalent positions ("2", "6", "10" and "14") exist at the same concentration level 6 (step P7). Then, it is checked whether the remainder of the dot number (in the present case, 5−4=1) is smaller than the number of the position having the same concentration level 6 (in the present case, four). Because the former is smaller than the latter in the present case, the remainder will be assigned according to the following steps by taking surrounding positions into account. First, an average surrounding concentration level is calculated (step P9). The average surrounding concentration level is defined as an average of the concentration levels of the positions which surround each position having the same concentration level. The average surrounding level is calculated from the concentration levels shown in FIG. 3, and is expressed with a combination of the central position and the average surrounding level as follows: "2"-5, "6"-6, "10"-6 and "14"-5. Next, it is decided whether the central positions having the same average surrounding level exist (step P10). In the present case, two positions "6" and "10" have the same average surrounding level. In such a case, the remainder of the positions to be printed cannot be assigned. Then, the remainder is assigned according to a predetermined priority order. In this embodiment, the priority order is set as follows: "1", "11", "3", "9", "6", "16", "8", "14", "2", "12", "4", "10", "5", "15", "7" and "13". This is the same order as the increasing order of the threshold values of the dither matrix of the Bayer type shown in FIG. 1. In the priority order, the position "6" is prior to the position "10". Therefore, the last position to be assigned is decided to be the position "6" (step P11). Next, the dot position 6 is designated as black (step P12). (If the positions can be determined only by the concentration levels (steps P7 and P8), the process is skipped to step P12 directly, and the positions for black dots are designated.)

Next, it is decided whether all the dot positions are designated (step P13). In this case, all the dot positions are already determined.

Then, it is decided whether all the submatrices are processed or not (step P14). After all the matrices are processed similarly, the bi-level data obtained are transmitted to an external equipment (step P15).

The coding of the half-tone image 2 (FIG. 5) is explained similarly in the following description. (In FIG. 5, the number of dots in each element is drawn, for convenience, so as to coincide with the value of the concentration level in the counterpart of the picture elements shown in FIG. 6.)

First, the concentration level signals sampled with the image sensor 11 are stored in the memory 13 (step P1).

After all of image 2 has been sampled, the concentration level signals are processed for a bi-level quantization as follows. Concentrations in the unit of a 4×4 submatrix shown in FIG. 6, which corresponds to the half-tone image 2 shown in FIG. 5, is read out of the memory 13 (step P2). An average concentration of the concentration pattern is calculated (step P3), and it is found to be 11.6. Next, the dot number is determined from the average concentration (step P4). It is determined to be eleven by cutting off the fraction of the average. (In case of white-dot output, it is determined to be five.)

Next, the concentration level data are arranged in the order of the concentration by sorting them (step P5). Similarly to the case of the line image 1, the concentration level data are indicated with the combination of "picture element position"-concentration level. Then, the concentration level data shown in FIG. 6 are arranged in the order of "4"-14, "8"-14, "11"-14, "12"-14, "15"-14, "16"-14, "7"-13, "10"-13, "14"-13, "13"-12, "3"-11, "6"-11, "9"-11, "5"-11, "5"-4, "2"-3 and "1"-2. (In case of white-dot output the order will be reversed.)

Next, black dots of the dot number determined will be assigned in the decreasing order of the concentration level. Picture element positions are decided to be printed or not in the order of the concentration level. First, the concentration level 14 is designated (step P6). It is found that six positions ("4", "8", "11", "12", "15" and "16") exist at the same concentration level "14".

A check is made to determine whether the number 6 of the picture elements at the same concentration level is larger than 1 (step P7). If the check is "Yes" as in this case, it is checked next whether the remainder (in the present case, eleven) still that remain to be assigned is smaller than the number of the positions at the same concentration level (in the present case, six) (step P8). Because the decision is "No" in the present case, we proceed to step P12 and the six positions for black dots are assigned. Then, it is decided whether the designation of black dots up to the dot number is completed (step P13). Because the decision is "No" in this case, the process is returned to step P6, and there is designated the next concentration level 13.

Three positions ("7", "10" and "14") having the concentration level "13" and one position ("13") having the concentration level "12" are assigned similarly.

After returning again to step P6, it is decided that three positions ("3", "6" and "9") exist at the concentration level 11 (step P7). Next, it is checked whether the remainder of the dot number (in the present case, one) is smaller than the number (three) of the positions at the same concentration level 11 (step P8). Because it is checked to be "Yes" in this case, the remainder of print positions will be assigned in the following steps by taking the surrounding concentration into account. First, an average surrounding level is calculated (step P9). We can express the average surrounding levels in pairs of the position and the average surrounding level as follows: "3"-11.0, "6"-9.125 and "9"-10.6, Then, the position "3" is assigned as the remainder of dot position (step P10). FIG. 13 shows a reproduction thus obtained.

After dot positions are all designated (step P13), the bi-level data thus obtained are transmitted to the memory 13, and then we proceed to a next submatrix (step P14). After all the submatrices are processed similarly, the data is transmitted to external equipment (step P15).

In step P9, a sum of the concentrations around the picture element under consideration can be used instead of the average concentration.

If we compare a reproduction (FIG. 12) of the line image 1 (shown in FIG. 2) according to the present invention with that according to a prior art dither process (FIG. 4), the former has a higher resolution than the latter, and reproduces the concentration more faithfully to the original picture. If we compare a reproduction (FIG. 13) of the half-tone image 2 (shown in FIG. 5) according to the present invention with that according to a prior-art dither process (FIG. 7), the former reproduces the concentration more faithfully to the original picture and has a higher resolution than the latter.

This invention may be practiced or embodied in still other ways without departing from the spirit or essential character thereof. The preferred embodiments described herein are therefore illustrative and not restrictive, the scope of the invention including variations which come within the meaning of the claims, are intended to be embraced therein.

What is claimed as new:

1. A method of image processing for sampling the concentration of each portion of an image divided into a unit of picture elements and for binarizing the concentrations of the picture elements in the unit into submatrices of predetermined size to obtain a bi-level image, being characterized in that the bi-level image is obtained from concentrations that have been sampled according to the steps as follows:
   (a) calculating the average of the concentrations of the picture elements at every submatrix to which the picture elements belong;
   (b) determining the number of picture elements in the submatrix to be treated as either one of black or white according to the calculated average;
   (c) assigning the picture elements in the submatrix to be treated as either one of black or white up to the number determined in the step (b) in order of concentration of each picture element in the submatrix;
   (d) deciding, during the prosecution of the step (c), whether the total number of elements that still remain to be assigned is smaller than the number of the elements having a similar concentration to be assigned next, and
   (e) assigning the elements to be assigned next in accordance with a predetermined concentration, which is calculated as either a sum or an average of concentrations of the elements surrounding each element having the same concentration when the number of elements that remain to be assigned is smaller than the elements that would be assigned next.

2. A method of image processing according to claim 1, wherein said processing of the concentrations comprises the further step of:
   (f) assigning the elements to be assigned next, in the order of a predetermined table defining the order of assignment in a submatrix, in the case where the surrounding concentrations calculated in the step (e) are equal to each other and therefore, it is impossible to assign elements in the order of surrounding concentration.

* * * * *